United States Patent Office 3,373,075
Patented Mar. 12, 1968

3,373,075
DIACRYLATE COMPOSITIONS, HEAT RESISTANT POLYMERS CONTAINING THE SAME AND METHOD OF MAKING ELECTRICAL LAMINATES THEREFROM
Frank Fekete, Monroeville, Patrick J. Keenan, Pittsburgh, and William J. Plant, Monroeville, Pa., assignors to H. H. Robertson Company, Pittsburgh, Pa., a corporation of Pennsylvania
No Drawing. Continuation-in-part of abandoned application Ser. No. 160,247, Dec. 18, 1961. This application Dec. 17, 1963, Ser. No. 331,106
6 Claims. (Cl. 161—185)

This application is a continuation-in-part of copending patent application Ser. No. 160,247 filed Dec. 18, 1961, now abandoned.

This invention relates to heat resistant solid cured thermoset resinous compositions, fibrous reinforced articles embodying the compositions adapted for use at elevated temperatures, to curable thermosetting resinous compositions for preparing the same including fibrous reinforcing elements and curable thermosetting resinous compositions, and to a process for preparing heat resistant articles comprising cured thermoset resinous components.

The present solid thermoset resinous compositions are of especial interest in electrical laminate sheets, in electrical armature slot sticks, in electrical banding tapes, in pre-pregs and pre-mixes.

STATEMENT OF INVENTION

According to this invention, thermosetting resinous compositions are provided which comprise as essential ingredients certain diacrylates having the formula

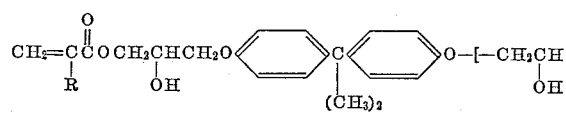

wherein R is a substituent selected from the class consisting of hydrogen, methyl and ethyl radicals and $n$ is an integer from zero to twenty. These diacrylates may be homopolymerized or may be copolymerized with copolymerizable monomers having at least one terminal $>C=CH_2$ radical. Such copolymerizable monomers include vinyl compounds, acrylic compounds and allyl compounds, for example. The diacrylates are prepared preferably by reaction of a diglycidyl ether or polyglycidyl ethers of Bisphenol-A with two mols of a carboxylic acid selected from the class consisting of acrylic, methacrylic and ethylacrylic acid.

The polyglycidyl ethers of Bisphenol-A have the following general formula

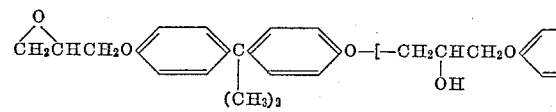

wherein $n$ is an integer from zero to twenty. In the instance wherein $n$ equals zero, the material is the diglycidyl ether of Bisphenol-A

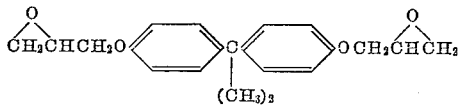

The reaction between the polyglycidyl ethers of Bisphenol-A and the carboxylic acid proceeds readily in the presence of triethylamine as a catalyst at relatively low temperatures. The two reactants are maintained at reactive conditions until substantially all of the epoxy groups are eliminated in the formation of beta-hydroxy carboxylic esters with the carboxylic acid:

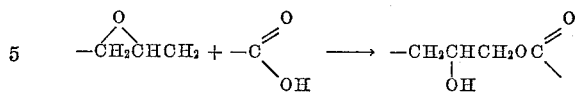

The present diacrylates are readily homopolymerizable in the presence of familiar addition polymerization initiators such as the peroxy compounds which are well known as initiators of the polymerization of $>C=CH_2$ radicals. These present diacrylates are also readily copolymerizable with monomers which contain at least one terminal $>C=CH_2$ radical, for example, styrene, vinyl toluene, divinyl benzene, diallyl phthalate, triallyl cyanurate, methyl methacrylate, ethyl methacrylate, methyl acrylate, ethyl acrylate, ethylene glycol dimethacrylate, beta-hydroxy ethyl methacrylate, beta-hydroxy propyl methacrylate, and other ones of the diacrylates of the general type under discussion, and the like.

The resinous compositions may be used alone or with filler substances such as calcium carbonate, mica, silica and the like as casting or encapsulating resins. However these present materials are of especial interest in combination with fibrous reinforcing materials such as glass fibers, glass filaments, woven glass fiber fabrics, glass fiber mats, glass fiber roving and bundles, and other fibrous materials which might be utilized as reinforcing fibers.

The cured thermoset resinous articles of this invention resist softening and loss of strength at elevated temperatures in the range of 150 to 500° F., i.e., in the general temperature range of Class H electrical insulating materials as established by the American Institute of Electrical Engineers. The present materials provide a relatively inexpensive thermoset resinous composition which not only retains its physical strength at elevated temperatures, but also retains its dielectric values and further resists deterioration from many common solvents and chemicals at these elevated temperatures. Deliberate post-cure heating steps improve the resistance of these cured thermoset articles to subsequent thermal exposure.

OBJECTS

The principal objects of this invention include:

To provide thermal resistant articles of thermoset resinous compositions, especially those which will retain substantial physical strength at elevated temperatures between about 150° and 500° F. and after exposure to such temperatures;

To provide fiber-reinforced thermoset articles which retain substantial structural strength and dielectric values during and after exposure to elevated temperatures;

To provide electrical laminates and castings which are useful at elevated temperatures;

To provide thermoset articles which are resistant to deterioration from many common solvents and chemicals;

To provide uncured resinous-coated fibrous substances which are useful in preparing resinous articles, such as banding tapes, pre-pregs and the like;

To provide homopolymers and copolymers of diacrylates of polyglycidyl ethers of Bisphenol-A which have been post-cure heated to achieve remarkable resistance to thermal deterioration.

DIACRYLATES

The diacrylates which are the essence of this invention are preferably formed by reaction between a polyglycidyl ether of Bisphenol-A having the formula

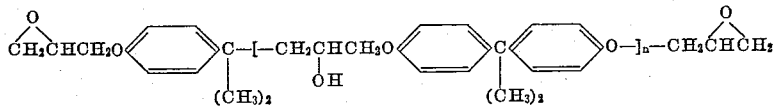

wherein $n$ is an integer from zero to twenty; and a monocarboxylic acid possessing ethylenic unsaturation and having the formula

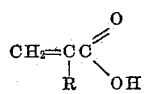

wherein R is a substituent selected from the class consisting of hydrogen, methyl and ethyl radicals. That is, the monocarboxylic acid may be acrylic, methacrylic or ethylacrylic acid. The carboxylic esters of these acids are herein referred to as acrylates.

The actual value of $n$ for each individual molecule of the diacrylate will be an integer. Nevertheless, the average value of $n$ for a typical diacrylate will only seldom be an integer for the reason that a spectra of values of $n$ normally is presented according to the composition of the polyglycidyl ether of Bisphenol-A which is selected. In the general use of the above formula, therefore, the designation of the value of $n$ refers to its average value whereby the composition will include materials having actual $n$-values above and below the designated value (except, of course, in the case wherein $n$ is zero).

Where $n$ is zero, the desired diacrylate may be formed alternatively by reaction of two mols of the glycidyl ester of a monocarboxylic acid

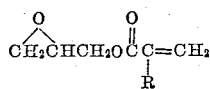

with Bisphenol=A, wherein as before, R is a substituent selected from the class consisting of hydrogen, methyl and ethyl radicals.

The reactions for preparing the diacrylate form no part of the present invention. The diacrylates may be prepared in an inert solvent such as toluene, acetone, benzene, xylene, dioxane, and the like. Alternatively the diacrylates may be prepared in a solution of a suitable copolymerizable monomer with which the desired diacrylate might be copolymerized to achieve the desirable thermoset articles of this invention. For example, the diacrylates may be prepared in a styrene solution which will be readily useful as a copolymerizable solution for the purposes of this invention. Such copolymerizable solvents are those possessing at least one terminal $>C=CH_2$ radical. In addition to styrene, diallyl phthalate and ethylene glycol dimethacrylate have been found to be useful solvents for the preparation of the present diacrylates directly in a copolymerizable medium.

COPOLYMERIZABLE MONOMER

Suitable copolymerizable monomers for the present diacrylates include those having at least one terminal $>C=CH_2$ radical. The copolymerizable monomers include styrene, vinyl toluene, divinyl benzene, ethylene glycol dimethacrylate, ethyl acrylate, methyl acrylate, methyl methacrylate, ethyl methacrylate, other alkyl and aryl acrylates, diallyl phthalate, diallyl isophthalate, triallyl cyanurate, triallyl isocyanurate, and the like. The copolymerizable monomer might also be another one of the diacrylates of this invention, i.e., wherein the value of $n$ or the identification of R is different from that of the principal ingredient.

COPOLYMERS—PROPORTIONS

The present diacrylates comprise from 95 to 50 weight percent of the copolymerizable resinous compositions of this invention with one or more copolymerizable monomers comprising from about 5 to 50 weight percent of the resinous composition. For each selected copolymerizable monomer, there is usually a precise proportion for achieving optimum values of desired properties. The optimum can readily be determined for each application within the general range of 5 to 50 percent by weight.

CURING CATALYSTS

The present diacrylates readily homopolymerize and readily form copolymers with monomers having at least one terminal $>C=CH_2$ radical in the presence of a suitable addition polymerization initiator, i.e., those which are useful in initiating polymerization of monomers having terminal $>C=CH_2$ radicals. Such addition polymerization initiators typically include the well-known peroxy catalysts such as benzoyl peroxide, tertiary butyl peroxide, cumene hydroperoxide, tertiary butyl perbenzoate, tertiary butyl hydroperoxide, dicumyl peroxide, and the like. The catalyst is used in sufficient quantity to achieve the desired gel and cure cycles for the particular application under consideration. Catalyst selection and specification is carried out in accordance with the well-developed technology of addition-polymerization catalysis. However, the catalyst usually is provided in amounts from about 0.1 to 3.0 percent by weight of the thermosetting resinous ingredients.

REINFORCING FIBERS

The precise nature of the reinforcing fibers will depend to some extent upon the nature of the product which is desired. Randomly arranged glass fibers in the form of mats and pads have been utilized in matched-metal mold fabrications and in the preparation of laminated articles and hand lay-up and spray-up fabrications. Woven glass fiber fabrics have been utilized in the fabrication of laminated articles with the present thermosetting resinous compositions. Glass filament bundles have been utilized in the fabrication of slot sticks. Glass fiber tapes and rovings have been utilized.

In some instances the present thermosetting resinous compositions are applied to the fibers as an impregnant. To accomplish the impregnation, the fibers, customarily arranged in individual oriented strands or individual multistrand threads, are drawn through a solvent-solution of the present thermosetting resinous composition. The viscosity of the solvent-solution is maintained at a level which assures retention of a desired weight of the solution on the fibers as a coating or impregnant. The solution-moistened fibers are dried to vaporize the inert solvent and leave behind an impregnation or coating of the present thermosetting resinous composition in a substantially tack-free or only slightly tacky condition. Customarily sufficient polymerization catalyst is included with the resinous solution to effect a resin cure when sufficient heat is applied to the impregnated fibers. The fibers thereafter may be applied to a desired article, and, upon heating of the article, a cure of the thermosetting resinous composition is achieved.

PRE-MIXES

The designation "pre-mix" is applied in the plastics industry to reinforced molding compounds which comprise various filler materials and a suitable resinous substance. The filler materials may be organic or inorganic, but customarily include such materials as asbestos, mica, quartz, silica, glass flakes, diatomaceous earth, clay, calcium silicate, calcium carbonate and other minerals, graphite, carbon black and other materials. The pre-mixes of this invention include typical filler substances with the diacrylates herein described.

POST-CURE HEATING

A feature of this invention is the discovery that the present thermoset resinous compositions possess the ability to resist thermal deterioration resulting from exposure to elevated temperatures from about 150 to 500° F. The present resinous compositions, of course, are subjected to slightly elevated temperatures during their cure. In fact, application of heat is the cause of curing of the present resinous compositions in some applications.

We have found that these present thermoset resinous articles inherently resist severe thermal degradation. We have further found that their resistance to thermal degradation may be greatly increased by deliberate post-cure heating for selected periods of time at step-wise increased temperatures which are sequentially above the actual cure temperatures of the articles. A post-cure heating at a temperature which is (a) above 150° F. and (b) also above the cure temperature, for a period of at least one hour will increase the resistance of the articles to thermal degradation in the range of 150 to 500° F.

In some instances, the cured article may be introduced directly after its cure to an actual operating environment wherein elevated temperatures are presented which themselves provide inherent post-cure as specified, i.e., above 150° F. and above the curing temperature for at least one hour. For example, armature slot-sticks, immediately after cure, may be installed into an electrical armature which will be subsequently placed into its operating environment. When the armature is thereafter placed in use, the elevated temperatures thereby generated will be sufficient to achieve the needed post-cure heating directly.

Where feasible, a deliberate post-cure heating of the cured resinous composition will increase the resistance to thermal degradation.

Typical and recommended post-cure heating regime might involve:

Heat for one hour at 150° C. (302° F.);
then heat for one hour at 175° C. (348° F.);
then heat for one hour at 200° C. (392° F.);
then heat for one hour at 220° C. (428° F.);
then heat for one hour at 230° C. (446° F.);
then heat for one hour at 240° C. (464° F.);
then heat for one hour at 250° C. (482° F.);
and heat for one hour at 260° C. (500° F.).

Cured thermoset articles comprising the present diacrylate resinous compositions, if post-cured heated in gradual stepwise exposures of increasing temperature, will develop remarkable heat shock resistance and will retain remarkable physical strength at the elevated temperatures.

Typical curing regimes for the present thermosetting resinous compositions involve gel-forming at about 70 to 90° F. followed by curing at 180 to 250° F. These temperatures are typical of the curing regimes for unsaturated polyesters in the presence of typical peroxy type addition-polymerization initiators.

EXAMPLES

Examples 1, 2 and 3 hereafter describe the preparation of various diacrylates according to this invention along with homopolymerization and copolymerization of such diacrylates. The diglycidyl ether of Bisphenol-A in Examples 1 and 2 is sold by Dow Chemical Company under the designation DER-332 and comprises essentially

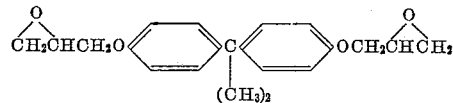

In Example 3, the designation Epon refers to epoxy resins (i.e., polyglycidyl ethers of Bisphenol-A) sold by Shell Chemical Company.

*Example 1.*—One mol DER-332 (346 g.), two mols acrylic acid (144 g.), one wt. percent triethylamine (4.9 g.) and 2.5 millimols toluhydroquinone (0.310 g.) were mixed and heated at 90° C. for two hours and then at 100° C. for four hours until the acid number dropped to 3.7 indicating about 98 percent conversion of the reactants to di(3-acryloxy - 2-hydroxypropyl) ether of Bisphenol-A.

The product was diluted with styrene to form a solution containing thirty parts by weight styrene. The solution had a viscosity of 550 cps. at 25° C. Addition of a polymerization initiator to the styrene solution formed a gel in 20 minutes and developed a Barcol hardness of 25-30 in the resulting thermoset copolymer.

*Example 2.*—Two mols methacrylic acid (172 g.), one percent by weight triethylamine and 600 p.p.m. by weight of p-quinone were mixed and heated to 125° C. One mol of DER-332 (346 g.) was added to the heated mixture dropwise over a period of one hour while the temperature was maintained at 125-130° C. The final acid number was less than 1, indicating virtual complete elimination of the epoxy groups from the DER-332. The syrupy product was di(3-methacryloxy - 2-hydroxypropyl) ether of Bisphenol-A.

*Example 3.*—Two mols of methacrylic acid were reacted with two mols of various polyglycidyl ethers of Bisphenol-A.

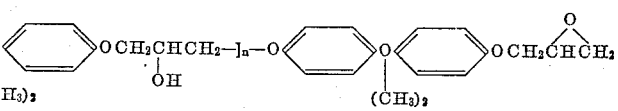

wherein the polyglycidyl ethers were commercially obtained with various values of $n$. In all instances 1 percent by weight of triethylamine was added as catalyst along with appropriate quantities of quinone or toluhydroquinone as inhibitor. The reactions were carried out at about 90° C. for reaction periods from 1 to 8 hours to a low acid number. The results are tabulated in the following Table I.

TABLE I.—REACTION PRODUCTS OF METHACRYLIC ACID AND VARIOUS COMMERCIALLY AVAILABLE POLYGLYCIDYL ETHERS OF BISPHENOL-A

| Run No. | Polyglycidyl Ether of Bisphenol-A | Value of $n$ | Final Acid No. | Color of Product |
|---|---|---|---|---|
| A | Epon 828 | 0.16 | 13 | Dark Brown. |
| B | Epon 834 | 0.60 | 1.9 | Amber. |
| C | Epon 836 | 1.02 | 2.9 | Dark Brown. |
| D | Epon 1001 | 2.23 | 5.9 | Amber. |
| E | Epon 1004 | 5.47 | 6 | Do. |
| F | Epon 1007 | 12.81 | 6.9 | Do. |

The product of Run A was diluted with styrene (20 percent styrene by weight) to a viscosity of 1650 cps. The diluted mixture cured to a clear casting with 1 percent by weight benzoyl peroxide to a Barcol hardness of 35-40.

The product of Run B was diluted with styrene (30 percent styrene by weight) to a viscosity of 320 cps. The mixture cured to a clear casting with 1 percent by weight benzoyl peroxide to a Barcol hardness of 25-30.

The product of Run C was diluted with styrene (30 percent styrene by weight) to a viscosity of 3640 cps. The mixture cured to a clear casting with 1 percent by weight benzoyl peroxide to a Barcol hardness of 24-25.

The product of Run D was diluted with syrene (30 percent styrene by weight) to a viscosity of 2300 cps. The mixture cured to a clear casting with 1 percent by weight benzoyl peroxide to a Barcol hardness of 25–30.

The product of Run F was diluted with styrene (50 percent styrene by weight) to a viscosity of 49,000 cps. The mixture cured to a clear casting with 1 percent by weight benzoyl peroxide.

A diacrylate as described in Example 2 was mixed with various copolymerizable monomers having a terminal $>C=CH_2$ radical. The binary mixtures were cured with peroxy catalysts to yield clear castings. The physical properties of the clear castings were evaluated. A homopolymer of the diacrylate also was cured to a clear casting for comparison purposes. The physical properties of the cured clear castings are set forth in the following Table II.

properties of the initial castings and the exposed castings were measured and are set forth in the following Table IV.

TABLE IV.—PHYSICAL PROPERTIES OF CLEAR CASTINGS OF CURED COPOLYMERS OF 70 PARTS BY WEIGHT OF THE DIACRYLATE OF EXAMPLE 2 AND 30 PARTS BY WEIGHT STYRENE

|  | Flexural Strength, p.s.i. | Flexural Modulus, p.s.i.×10⁶ | Barcol Hardness |
|---|---|---|---|
| Initial Values | 19,740 | 0.479 | 40–43 |
| REAGENT |  |  |  |
| 5% Nitric Acid | 16,700 | 0.458 | 42 |
| 25% Sulfuric Acid | 15,400 | 0.446 | 38–40 |
| 15% Hydrochloric Acid | 17,000 | 0.440 | 42–43 |
| 25% Acetic Acid | 12,700 | 0.358 | 32–40 |
| 5% Sodium Hydroxide | 19,500 | 0.410 | 36–38 |
| 10% Sodium Hydroxide | 2,000 | 0.329 | 26–32 |
| 5.25% Bleach (NaOCl) | 18,900 | 0.447 | 36–42 |

Study of Table IV reveals that the present copolymers resist deterioration resulting from combined thermal and TABLE II.—PHYSICAL PROPERTIES OF CASTINGS PREPARED FROM THE DIACRYLATE OF EXAMPLE 2 AND VARIOUS COPOLYMERIZABLE MONOMERS

| Copolymerizable Monomer | Barcol Hardness | Tensile Strength, p.s.i. | Tensile Modulus, p.s.i.×10⁶ | Flexural Strength, p.s.i. | Flexural Modulus, p.s.i.×10⁶ | Heat Distortion Point, °C. | IZOD Impact, ft./lbs. |
|---|---|---|---|---|---|---|---|
| None, homopolymer | 43 | 4,840 | 0.528 | 19,195 | 0.495 | 130 | 0.92 |
| Styrene, 20% | 45 | 8,548 | 0.488 | 19,000 | 0.505 |  | 1.43 |
| Styrene, 30% | 45 | 8,326 | 0.409 | 19,746 | 0.479 |  | 1.85 |
| Styrene, 50% | 38 | 9,545 | 0.463 | 19,390 | 0.489 |  | 1.92 |
| Methyl methacrylate, 10% | 45 | 4,600 | 0.432 | 12,200 | 0.580 | 140 |  |
| Methyl methacrylate, 25% | 48 | 11,650 | 0.943 | 21,500 | 0.618 | 134 |  |
| Methyl methacrylate, 50% | 48 | 13,400 | 0.844 | 19,170 | 0.575 | 129 |  |
| Ethylene glycol dimethacrylate, 10% | 50 | 7,500 | 1.180 | 15,025 | 0.504 | 143 |  |
| Ethylene glycol dimethacrylate, 25% | 51 | 6,670 | 0.926 | 16,620 | 0.615 | 206 |  |
| Ethylene glycol dimethacrylate, 50% | 55 |  |  | 8,245 | 0.576 |  |  |
| Diallyl Phthalate, 25% | 49 | 13,320 | 0.842 | 16,650 | 0.601 | 127 |  |
| Triallyl cyanurate, 25% | 54 | 12,330 | 1.166 | 16,110 | 0.682 | 145 |  |

All of the thermoset cured resinous compositions in Table II were evaluated by ASTM Test D790–59T to determine flexural properties; by ASTM Test D638–58T to determine tensile properties.

RESISTANCE TO CHEMICALS AND SOLVENTS

Clear castings of the present cured resinous compositions were exposed to various common solvents at the boiling temperature of each solvent for two weeks. Thereafter certain physical properties of the exposed castings were measured. The selected castings were (A) a homopolymer of the diacrylate of Example 2 and (B) a copolymer of ninety parts by weight of the diacrylate of Example 2 and ten parts by weight styrene. The properties of the initial and exposed castings are set forth in the following Table III.

chemical exposure at 210° F. for two months. The values of flexural strength are at least 60 percent of the original values except where the chemical was 10 percent sodium hydroxide. However the five percent sodium hydroxide solution had virtually insignificant effect on the flexural strength of the castings.

GLASS FABRIC LAMINATES

Laminates were prepared from the thermosetting resinous diacrylate of Example 2 as a homopolymerizable composition (identified as Specimen A) and also as a copolymerizable composition including the diacrylate of Example 2 and twenty percent styrene (identified as Specimen B). In each instance the laminate contained twelve plies of glass fiber fabric. The laminates were prepared by dipping the glass fiber fabric into acetone solutions of the TABLE III.—PHYSICAL PROPERTIES OF CLEAR CASTINGS AFTER BOILING IN VARIOUS SOLVENTS FOR TWO WEEKS

|  | Solvent Boiling Temp., °C. | Homopolymer of the Diacrylate of Example 2 | | | Copolymer of the diacrylate of Example 2 (90 parts) and Styrene (10 parts) | | |
|---|---|---|---|---|---|---|---|
|  |  | Flexural Strength, p.s.i. | Flexural Modulus p.s.i. ×10⁶ | Barcol Hardness | Flexural Strength, p.s.i. | Flexural Modulus, p.s.i. ×10⁶ | Barcol Hardness |
| Initial Values |  | 14,260 | 0.650 | 47 | 14,050 | 0.587 | 42 |
| Solvent: |  |  |  |  |  |  |  |
| Toluene | 111 | 13,825 | 0.516 | 44 | 11,245 | 0.390 | 22 |
| Trichloroethylene | 87 | 14,100 | 0.508 | 43 | 16,305 | 0.605 | 51 |
| Kerosene | 192 | 10,950 | 0.546 | 51 | 15,650 | 0.579 | 45 |
| Diesel fuel | 215 | 15,180 | 0.605 | 50 | 17,150 | 0.574 | 46 |
| Gasoline (no lead) | 100 | 15,200 | 0.591 | 51 | 19,625 | 0.603 | 49 |
| Gasoline (leaded) | 75 | 12,800 | 0.538 | 53 | 15,600 | 0.555 | 54 |
| ASTM Oil No. 2 | 122 | 11,390 | 0.602 | 52 | 11,075 | 0.614 | 52 |
| Turbo Fuel No. 4 | 112 | 16,000 | 0.603 | 50 | 13,415 | 0.561 | 53 |
| n-Heptane | 98 | 18,835 | 0.603 | 52 | 10,440 | 0.545 | 52 |
| JP-4 Fuel | 128 | 13,670 | 0.546 | 52 | 9,960 | 0.558 | 52 |

It will be observed from a study of Table III that the present copolymers and homopolymers exhibit greater resistance to thermal exposure even in the presence of common solvents. The flexural strength, flexural modulus and Barcol hardness values retained at least 70 percent of their initial value in all reported instances. In some instances, the values of those properties actually increased as a result of the post-cure heating.

Various clear thermoset castings of the present resinous compositions were exposed to various common chemicals at 210° F. for two months. Thereafter certain physical properties of the exposed castings were measured. The resins and, after air-drying, compressing twelve plies of the coated fabric between two heated plates at about 250° C. for 2.5 minutes to achieve the desired resin curing.

The flexural strength and flexural modulus were measured according to ASTM Test D790–59T for the initial laminates. The laminates then were post-cure heated at 150° C. for one hour; at 170° C. for one hour; at 190° C. for one hour; at 210° C. for one hour; and finally at 220° C. for two hours. Thereafter the laminates were thermally exposed at 500° F. for 192 hours and the flexural strength of the laminates was then measured at 500° F. Other specimens were boiled in water for two hours and the flexural strength measured after the boiled specimens and cooled to room temperature. Further specimens were heated at 200° C. in an oven for thirty days and their flexural strength was measured at room temperature after cooling. The results of these laminates tests are set forth in the following Table V.

at room temperature and at 180° C. Specimens were post-cure heated at 220° C. for 500 hours and the same physical properties were measured at room temperature and at 180° C. The results are set forth in the following Table VI.

TABLE VI.—PHYSICAL PROPERTIES OF LAMINATE ARTICLES FORMED IN MATCHED METAL MOLDS FROM THE PRESENT RESINOUS COMPOSITIONS AND GLASS FIBER MATS

| Specimen | Flexural | | Tensile | |
| --- | --- | --- | --- | --- |
| | Strength, p.s.i. | Modulus, p.s.i.×10⁶ | Strength, p.s.i. | Modulus, p.s.i.×10⁶ |
| Tests at Room Temperature: | | | | |
| Laminates (no post-cure heating) | 32,100 | 1,820 | 17,570 | 1.550 |
| After 200 hrs. post-cure heating at 220° C | 26,300 | 1,392 | 13,750 | 1.285 |
| After 500 hrs. post-cure heating at 220° C | 18,100 | 1,282 | 9,900 | 1.250 |
| Tests at 180° C.: | | | | |
| Laminates (no post-cure heating) | 8,580 | 0.642 | | |
| After 200 hrs. post-cure heating at 200° C | 15,700 | 0.763 | | |
| After 500 hrs. post-cure heating at 220° C | 16,900 | 0.965 | | |

TABLE V.—FLEXURAL STRENGTH OF GLASS FABRIC LAMINATES

| | Specimen A | Specimen B |
| --- | --- | --- |
| Glass content of laminate, wt. percent | 58.6 | 63.2 |
| Flexural Strength, p.s.i., initial | 60,500 | 71,000 |
| Flexural Strength, p.s.i., after 192 hours at 500° F. (measured at 500° F.) | 21,500 | |
| Flexural Strength, p.s.i., after two hours boiling in water (measured at room temperature) | 53,560 | 63,000 |
| Flexural Strength, p.s.i., after thirty days at 200° C. (measured at room temperature) | 54,000 | 60,000 |

It should be observed that 84 percent of the initial flexural strength of both laminates is retained after two hours boiling in water. Similarly 85 and 88 percent of the initial strength is retained after 200° C. exposure for thirty days. More than 35 percent of the initial flexural strength is exhibited at 500° F. after 192 hours exposure to temperatures of 500° F. Note that the flexural strength was measured at 500° F. indicating the actual strength which is available in the environment.

GLASS FIBER MAT LAMINATES

A curable copolymerizable resinous composition was prepared with the diacrylate of Example 2 dissolved in 25 percent by weight styrene. Seventy parts by weight of the styrene solution were mixed with 30 parts by weight of calcium carbonate as a filler. One percent tert-butyl perbenzoate (based on the weight of resinous materials) was added as a polymerization initiator. The composition was applied to glass fiber mats in a matched-metal mold to form a laminate. Four glass fiber mats were used, each having 1.5 ounces of glass fiber per square foot of mat surface. The four mats were arranged one-atop-another as a four-layer sandwich assembly. A sufficient quantity of the resinous composition was used to prepare a laminate which comprised about 40 percent glass fiber. The laminate was cured between the heated plates of the mold for ten minutes at 265° F. under a pressure of 200 p.s.i. The cured article was a flat sheet, three feet wide by four feet long and about one-eighth-inch thick.

Flexural and tensile strength and flexural and tensile modulus were measured without postcure heating, both at room temperature and at 180° C. Specimens were post-cure heated in accordance with this invention at 220° C. for 200 hours and the same properties were measured It will be observed from Table VI that the elevated temperature flexural strength of the laminates increases significantly with post-cure heating treatment when that property is measured at an elevated temperature (180° C.). While the absolute value of the flexural strength appears to diminish (if measured at room temperature), yet the absolute value of the flexural strength and flexural modulus actually increases if that property is measured at an elevated temperature.

BANDING TAPES

Impregnated banding tapes were prepared from the following resinous composition in solution:

Substance: Parts by weight
The diacrylate of Example 2 _____ 100
Diallyl phthalate _____ 100
Toluene _____ 120
Ethyl alcohol _____ 80
Barrier ingredient which was polyvinyl formal, available commercially from Shawinigan Resins Corp. under the tradename Formvar _____ 30
Dicumyl peroxide (polymerization catalyst) _____ 2

The resinous solution is applied as a coating to plural multi-filament glass fiber strings which are drawn through a bath of the resinous solution and brought together to form a parallel-strand tape (free of crossing strands) which is dried to evaporate the toluene and ethyl alcohol solvents. The dried, resin-impregnated banding tape is spooled and used subsequently to wrap electrical armatures. The wrapped armatures are preferably baked to effect a cure of the impregnated resinous composition and subsequently post-cure heated to achieve the desired thermal resistance. The banding tape serves in place of steel wire bands on the armatures of the prior art.

HIGH MOLECULAR WEIGHT DIACRYLATES

Diacrylates having values of $n$ greater than one in the following generalized formula are of particular interest as will be hereinafter described.

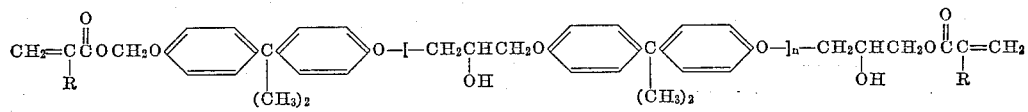

wherein R is a substituent selected from the class consisting of hydrogen, methyl and ethyl radicals and $n$ is an integer. Where $n$ has a value greater than 1, the polymerizable resinous diacrylate can be handled only in a solvent. The solvent may be inert or may be copolymerizable with the diacrylate. The resin will be prepared by reacting in the presence of a suitable catalyst such as triethylamine, a monocarboxylic acid having the formula

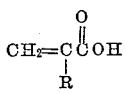

with a polyglycidyl ether of Bisphenol-A:

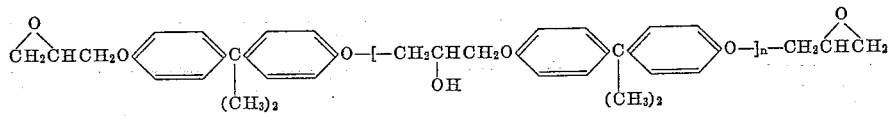

where $n$ is an integer greater than one and less than twenty. The high molecular weight resin has a molecular weight in the range from about 800 to 8000, and preferably from about 1000 to 3000. These materials can be impregnated upon various materials from their solution in volatile solvents such as acetone. The materials as impregnants are nearly dry to the touch, i.e., they are non-tacky. Preferably a suitable polymerization initiator such as benzoyl peroxide is combined with the high molecular weight resins for conjoint impregnation upon glass fiber tapes and mats. The storage life of such catalyzed, impregnated fibrous materials is commercially feasible; storage life of such catalyzed materials has exceeded one year in some instances.

These high molecular weight resins moreover are of especial interest where excellent chemical resistance is required at elevated temperatures.

A specimen of the present high molecular weight resin was prepared from methacrylic acid and a polyglycidyl ether of Bisphenol-A having a value of $n$ of about 2.0 to 2.1. The resulting diacrylate resin can be diluted with 50 percent styrene to produce a copolymerizable composition having a viscosity of about 500 cps. at 77° F. The styrene copolymers are readily cured, for example, with benzoyl peroxide as initator. The cured copolymers exhibit a Barcol hardness of 37, a heat distortion point (264 p.s.i.) of 101° C., a flexural strength of 19,475 p.s.i. and a flexural modulus of $0.493 \times 10^6$ p.s.i. Clear casting specimens were placed in beakers containing common chemicals at 210° F. for two months. The thermal exposure is, within the intent of this invention, a post-cure heat treatment which serves to increase the resistance of these cured copolymers to thermal degradation. The flexural strength and flexural modulus of the specimens was measured after the extended chemical exposure. The results are set forth in the following Table VII.

TABLE VII.—PHYSICAL PROPERTIES OF CLEAR CASTINGS OF HIGH MOLECULAR WEIGHT DIACRYLATES AND STYRENE COPOLYMERS (CONTAINING 45% BY WEIGHT STYRENE)

| Reagent | Flexural Strength, p.s.i. | Flexural Modulus, p.s.i.×10⁶ |
|---|---|---|
| None (initial values) | 19,475 | 0.493 |
| 5% nitric acid | 6,020 | 0.470 |
| 25% sulfuric acid | 16,725 | 0.477 |
| 15% hydrochloric acid | 13,000 | 0.479 |
| 25% acetic acid | 6,250 | 0.392 |
| 5.25% bleach (NaOCl) | 16,000 | 0.502 |
| 5% sodium hydroxide | 19,650 | 0.483 |
| 10% sodium hydroxide | 19,080 | 0.479 |

In all instances reported in Table VII, the specimens were tested in the wet condition immediately after removal from the beakers containing the chemicals. If the specimens were permitted to dry and recover from the exposure for about eight hours, the flexural strength and moduli values usually increase.

From inspection of Table VII, it is of interest to note that remarkable retention of physical properties is evidenced after exposure to sodium hydroxide solutions. The present thermoset copolymers retain virtually all their flexural strength after extensive exposure to boiling caustic solutions. The flexural moduli are only slightly diminished. Further tests have been carried out to demonstrate the remarkable resistance of these high molecular weight diacrylate copolymers to alkaline deterioration at elevated temperatures.

The effect of post-cure heating treatments on the copolymers of high molecular weight diacrylates (as just described) is exhibited from three specimens as follows:

*First specimen.*—The copolymerizable composition just described (45 weight percent styrene and 55 weight percent of the methacrylic acid ester of polyglycidyl ether of Bisphenol-A having a value of $n$ from 2.0 to 2.1) was catalyzed with 1 percent by weight t-butyl perbenzoate. The composition gelled at 180–210° F. and, after cure, was post-cure heated at 250° F. for one hour and thence at 300° F. for two hours.

*Second specimen.*—The copolymerizable composition was cured with 1% benzoyl peroxide and 0.3% by weight of a six percent solution of cobalt naphthenate. Gelation occurred at 77° F. and the cure was completed in four days at 77° F. The castings were post-cure heated at 120° C. (248° F.) for one hour and then at 150° C. (302° F.) for two hours.

*Third specimen.*—The copolymerizable composition was cured with 1% benzoyl peroxide and 0.3% of a six percent solution of cobalt naphthenate. Gelation was carried out at 77° F. and the castings cured at 77° F. in four days. There was no post-cure heat treatment.

All three specimens were tested for flexural strength and modulus and thereafter placed in 25% potassium hydroxide at 210° F. for a week. The specimens thereafter were cooled to room temperature in the potassium hydroxide solution, dried and immediately tested for physical properties. The flexural strength, modulus and weight increase in each instance is presented in Table VIII.

TABLE VIII.—PHYSICAL PROPERTIES—COPOLYMERS OF 55 PARTS BY WEIGHT HIGH MOLECULAR WEIGHT DIACRYLATES AND 45 PARTS BY WEIGHT STYRENE

| Specimen | Flexural Strength, p.s.i. | Flexural Modulus, p.s.i.×10⁶ | Weight Increase, percent |
|---|---|---|---|
| Initial Values: | | | |
| First | 19,500 | 0.493 | |
| Second | 17,600 | 0.497 | |
| Third | 14,200 | 0.402 | |
| After One Week in Boiling Potassium Hydroxide: | | | |
| First | 16,500 | 0.415 | 1.3 |
| Second | 15,300 | 0.469 | 1.4 |
| Third | 14,800 | 0.491 | 1.5 |

From Table VIII, it is seen that the First Specimen retained 85 percent of its initial flexural strength after the severe caustic exposure. The Second Specimen retained 87 percent of its initial flexural strength after the same exposure. Both the First and Second Specimens received a post-cure heat treatment in accordance with this invention. The Third Specimen did not receive any post-cure heat treatment and presented an initial flexural strength which was only 73 percent of the initial value of the First Specimen. More significant, however, is the fact that the thermal exposure at 210° F. in the presence of 25% solution of potassium hydroxide actually increased the flexural strength of the Third Specimen from 14,200 to 14,800 p.s.i.

The resistance to caustic exposure of the thermoset resinous compositions containing these high molecular weight diacrylates as homopolymers and as copolymers has resulted in their acceptance as components of alkaline batteries and fuel cells. The relative non-tackiness of the high molecular weight diacrylates prior to their cure has resulted in their gaining acceptance as a pre-preg resin.

MIXTURES OF DIACRYLATES

The relatively high molecular weight diacrylates, i.e., those wherein the value of $n$ is greater than one, have been successfully blended with lower molecular weight diacrylates, i.e., those similar to the diacrylate of Example 2 wherein $n$ is zero to yield copolymerizable mixtures of diacrylates. The mixtures also readily blend with and copolymerize with the herein-described copolymerizable monomers such as styrene and the like.

A mixture of 40 parts by weight of the diacrylate of Example 2 was mixed with 60 parts by weight of a high

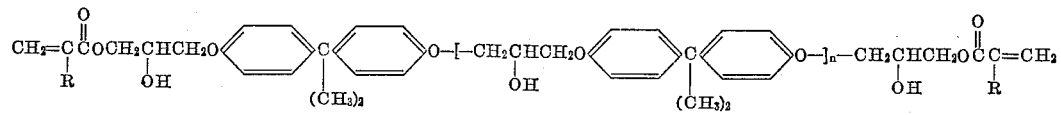

molecular weight diacrylate wherein the value of $n$ was about 2.0 to 2.1. Seventy parts by weight of that mixture was dissolved in thirty parts by weight styrene to yield a copolymerizable resinous composition. The composition cured readily with the peroxy polymerization initiators. The clear castings, without post-cure heat treatment, exhibited a flexural strength of 15,750 p.s.i., a flexural modulus of 0.475 and a Barcol hardness value of 41. These clear castings were exposed to common solvents at their boiling temperatures for two weeks. After the solvent exposure, the castings were allowed to cool to room temperature in the solvent and thereafter were removed from the solvent and immediately tested for physical properties.

The solvents included gasoline (lead-containing), ASTM Oil #1, Turbo Fuel #4 and n-heptane. The results of the tests are set forth in the following Table IX.

TABLE IX.—FLEXURAL PROPERTIES OF MIXED DIACRYLATES AND STYRENE COPOLYMERIZED CASTINGS AFTER TWO WEEKS EXPOSURE TO COMMON SOLVENTS AT BOILING TEMPERATURES

| Solvent and Boiling Temperature | Flexural Strength, p.s.i. | Flexural Modulus, p.s.i.×10⁶ | Barcol Hardness |
|---|---|---|---|
| None (initial values) | 15,750 | 0.475 | 41 |
| Gasoline (lead-containing), 75.5° C | 22,400 | 0.538 | 47 |
| ASTM Oil No. 1, 194° C | 18,650 | 0.553 | 41 |
| Turbo Fuel No. 4, 112.5° C | 22,900 | 0.589 | 46 |
| n-Heptane, 98.5° C | 20,300 | 0.514 | 46 |

Note in the instances reported in Table IX, the flexural strength and modulus of the castings actually increased after exposure to common solvents at their boiling temperatures, indicating that the elevated temperature solvent exposure served as a post-cure heat treatment in accordance with this invention.

We claim:
1. A thermoset solid article adapted for use at elevated temperatures from about 150° to 500° F. comprising as the resinous component thereof a polymerized mass formed by addition polymerization of at least one diacrylate having the formula

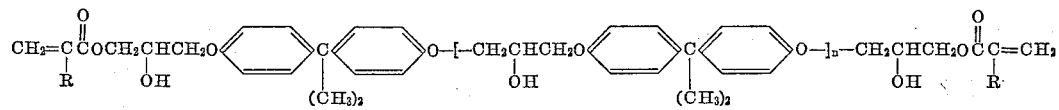

wherein R is a substituent selected from the class consisting of hydrogen, methyl and ethyl radicals and $n$ is an integer from zero to twenty;
the said article after polymerization and said mass having been exposed to an elevated temperature which is above its curing temperature and also is above 150° F. for more than one hour.

2. A thermoset solid article adapted for use at elevated temperatures from about 150 to 500° F. comprising as the resinous component thereof a copolymerized mass forward by addition polymerization of
(a) from 95 to 50 percent by weight of a diacrylate having the formula

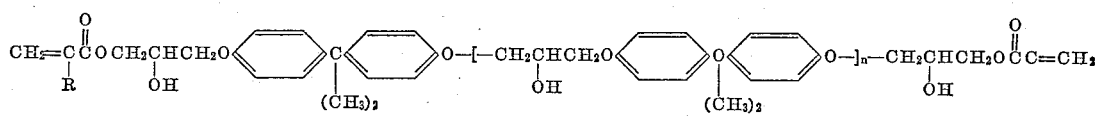

wherein R is a substituent selected from the class consisting of hydrogen, methyl and ethyl radicals and $n$ is an integer from zero to twenty; and
(b) from about 5 to 50 percent by weight of at least one copolymerizable monomer having at least one terminal $>C=H_2$ radical,
the said solid article after polymerization of said mass having been exposed to an elevated temperature which is above its curing temperature and also is above 150° F. for more than one hour.

3. A thermoset solid article adapted for use at elevated temperatures from about 150 to 500° F. comprising fibrous reinforcing elements embedded within a cured thermoset resinous composition comprising a polymerized mass formed by addition copolymerization of
(a) from 95 to 50 weight percent of a diacrylate having the formula wherein R is a substituent selected from the class consisting of hydrogen, methyl and ethyl radicals, and $n$ is an integer from zero to twenty; and
(b) about 5 to 50 percent by weight of at least one copolymerizable monomer having a terminal $>C=H_2$ radical;
the said article after copolymerization of said mass having been exposed to an elevated temperature which is above its curing temperature and also is above 150° F. for at least one hour.

4. A laminated article comprising glass fibers embedded within a cured thermoset resinous composition comprising a copolymerized mass formed by addition polymerization of (a) from 95 to 50 percent by weight of a diacrylate having the formula

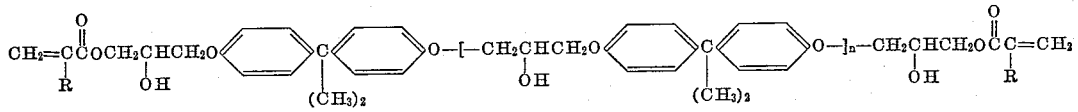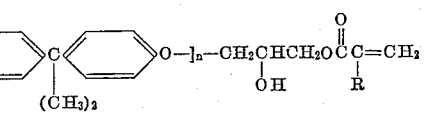

wherein R is a substituent selected from the class consisting of hydrogen, methyl and ethyl radicals and $n$ is an integer from zero to twenty; and
(b) about 50 to 50 percent by weight of at least one copolymerizable monomer having a terminal $>C=CH_2$ radical;
said laminated article after copolymerization of said mass having been exposed to an elevated temperature which is above its curing temperature and also is above 150° F. for more than one hour.

5. A fibrous impregnating composition comprising a solution of polymerizable resinous material substantially free of unreacted epoxy radicals comprising, in an inert volatile solvent, at least one diacrylate having the formula

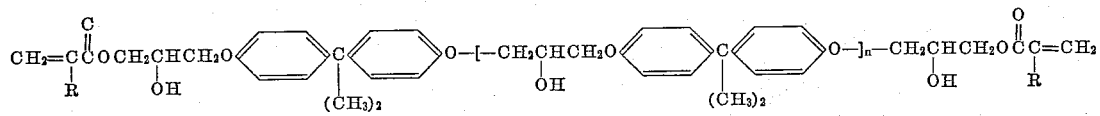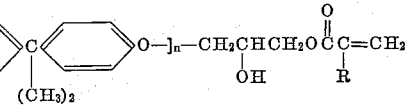

wherein R is a substituent selected from the class consisting of hydrogen, methyl and ethyl radicals and $n$ is an integer from one to twenty;
and a polymerization-initiating quantity from 0.1 to 3.0 percent by weight of an addition polymerization initiator capable of causing addition polymerization between $>C=CH_2$ radicals at elevated temperatures.

6. A method of preparing an electrical laminate comprising
(1) compressing a resinous mixture with fibrous reinforcing materials in the presence of an addition polymerization initiator capable of causing addition polymerization between $>C=CH_2$ radicals to effect a thermoset cure of the said resinous mixture;
(2) recovering a solid, thermoset resinous article having the said reinforcing materials embedded therein;
(3) post-cure heating the said thermoset resinous article at a temperature which is above the curing temperature and also is above 150° F. for a period greater than one hour whereby the post-cure heated article resists severe reduction in flexural strength and reduction in flexural modulus at elevated temperatures in the range of 150 to 500° F.;
wherein the said resinous mixture includes (a) from 95 to 50 percent by weight of a diacrylate having the formula

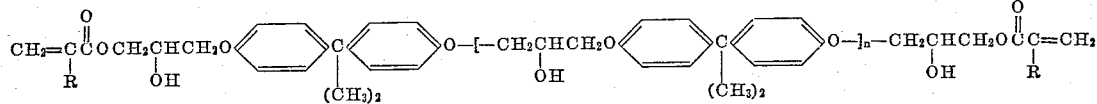

wherein R is a substituent selected from the class consisting of hydrogen, methyl and ethyl radicals and $n$ is an integer from zero to twenty; and
(b) from 5 to 50 percent by weight of at least one copolymerizable monomer having at least one terminal $>C=CH_2$ radical.

References Cited

UNITED STATES PATENTS

| | | | |
|---|---|---|---|
| 2,331,265 | 10/1943 | Coleman et al. | 260—486 X |
| 2,359,622 | 10/1944 | Coleman et al. | 260—486 X |
| 2,575,440 | 11/1951 | Bradley | 260—486 X |
| 2,604,464 | 7/1952 | Segall et al. | 260—47 |
| 2,859,199 | 11/1958 | Parker | 260—835 |
| 3,067,222 | 12/1962 | Anderson | 260—486 |
| 3,156,580 | 11/1964 | Howard | 117—75 |
| 2,784,128 | 5/1957 | Schroeder | 260—837 X |
| 2,824,851 | 2/1958 | Hall | 260—837 |
| 3,066,112 | 11/1962 | Bowen | 260—47 X |

EARL M. BERGERT, *Primary Examiner.*

HAROLD ANSHER, *Examiner.*

UNITED STATES PATENT OFFICE
CERTIFICATE OF CORRECTION

Patent No. 3,373,075            March 12, 1968

Frank Fekete et al.

It is hereby certified that error appears in the above numbered patent requiring correction and that the said Letters Patent should read as corrected below.

Columns 3 and 4, lines 9 to 14, the formula should appear as shown below:

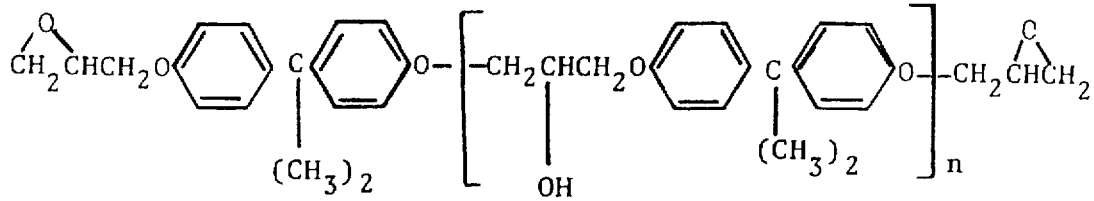

Columns 5 and 6, lines 38 to 40, the formula should appear as shown below :

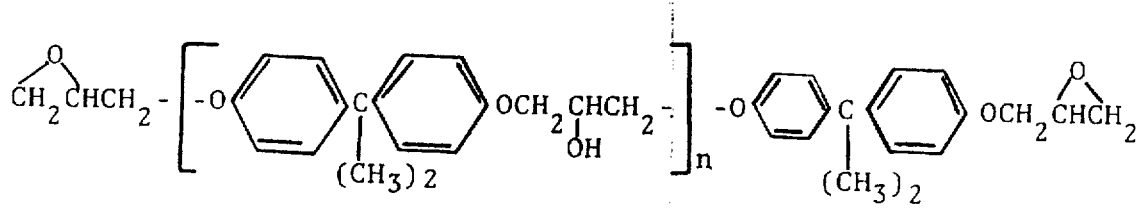

Columns 9 and 10, TABLE VI, first column, line 7 thereof, "200° C." should read -- 220° C. --; same table, third column, line 1, 2 and 3 thereof, "1,820" "1,392" and "1,282" should read -- 1.820 --, -- 1.392 -- and -- 1.282 --. Column 14, line 24, "forward" should read -- formed --; lines 40 and 67, >C=H$_2$, each occurrence, should read    >C=CH$_2$ Columns 13 and 14, lines 52 to 54, the formula should appear as shown below:

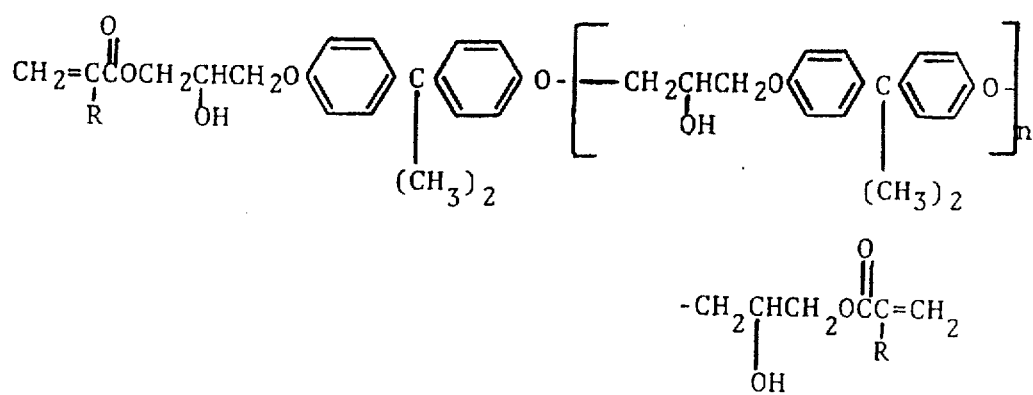

3,373,075

(2)

Column 15, line 12, "50 to 50" should read -- 5 to 50 --; lines 25 to 28, that portion of the formula reading

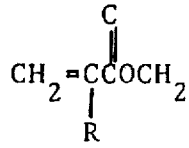   should read   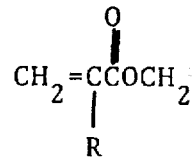

Signed and sealed this 23rd day of September 1969.

(SEAL)
Attest:

EDWARD M. FLETCHER, JR.  
Attesting Officer

WILLIAM E. SCHUYLER, JR.  
Commissioner of Patents